Nov. 1, 1927.
A. M. HUNT
BEARING
Filed Jan. 4, 1926
1,647,523
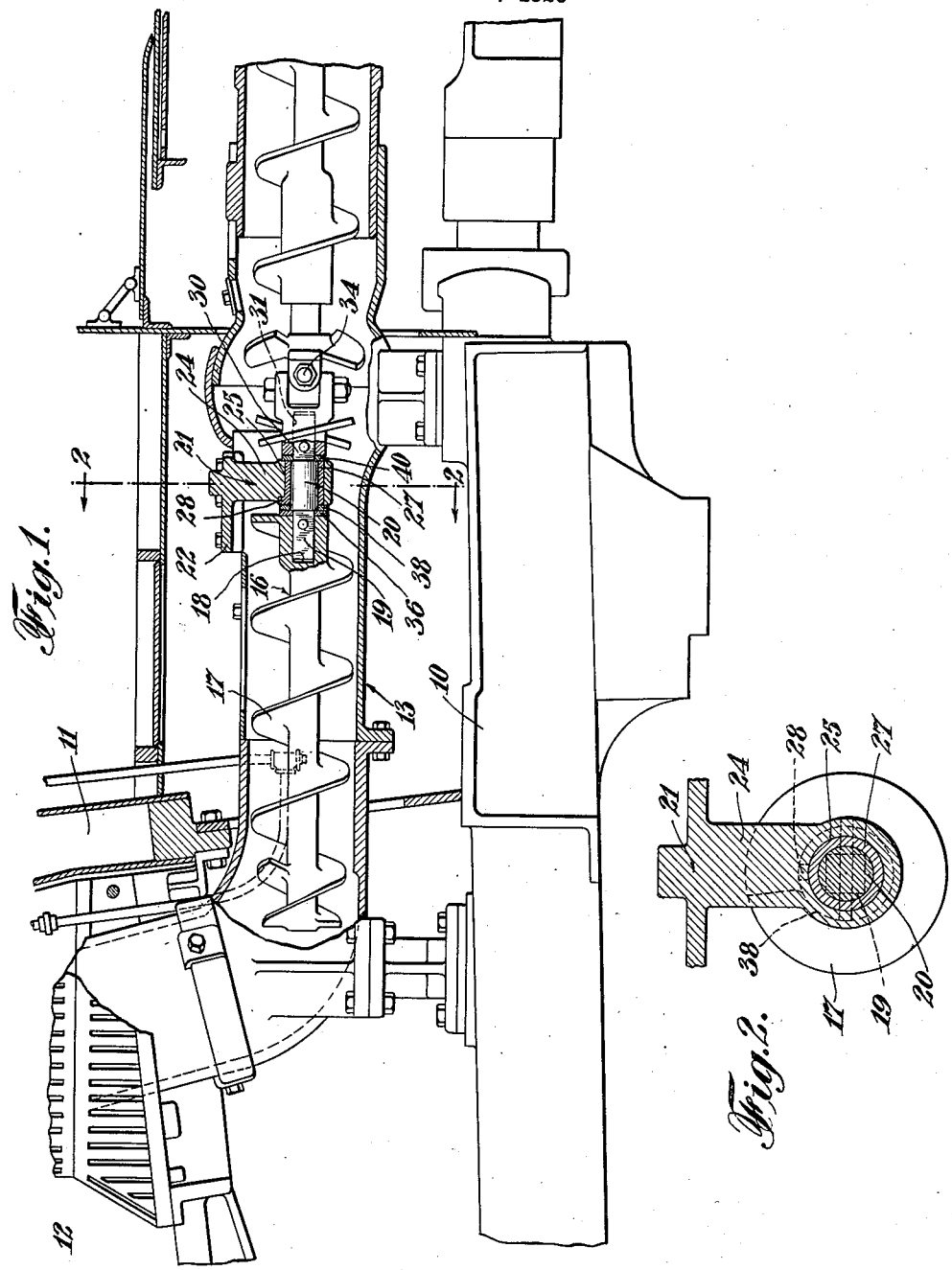
Inventor
Andrew M. Hunt.
By his Attorneys
Edwards, Sager & Bower Patented Nov. 1, 1927.

1,647,523

UNITED STATES PATENT OFFICE.

ANDREW MURRAY HUNT, OF NEW YORK, N. Y., ASSIGNOR TO STANDARD STOKER COMPANY, INCORPORATED, A CORPORATION OF DELAWARE.

BEARING.

Application filed January 4, 1926. Serial No. 79,088.

This invention relates to bearings and more particularly to bearings which because of their relatively inaccessible location or otherwise receive very little or no lubrication.

I have discovered that when two bearing surfaces which rub on one another are both composed of manganese steel that, even though these surfaces do not receive lubrication, the wear of the surfaces is extremely small. Not only is the abrasion minimized, but there is none of the tearing action which is customary when one tough metal rubs on another.

While my invention is of general application, in the embodiment herein illustrated, I apply it to a supporting and thrust bearing for a locomotive stoker conveyor screw. This bearing is located in the housing or conduit through which the coal is moved by the screw, and in such location it is not easily accessible for lubrication, and in practice seldom receives lubrication. As manganese steel can be machined only with the greatest difficulty, I have devised a bearing of the type indicated wherein the rubbing surfaces are formed of pieces of manganese steel which may be readily fabricated without machining.

In the accompanying drawing, which illustrates this embodiment of my invention, Fig. 1 is a longitudinal sectional view, partly in elevation and partly broken away, through a locomotive stoker conveyor conduit, showing a conveyor screw and a depending bearing for supporting and receiving the backward thrust of the screw shaft, and Fig. 2 is a section taken on the line 2—2 of Fig. 1.

Referring to the drawing, 10 represents the frame of a locomotive, 11 the rear water leg of the boiler which forms the rear wall of the fire box 12, and 13 represents a stoker conduit supported in part on the frame 10. The conduit 13 extends forwardly from the coal bin in the locomotive tender, not shown, and is formed of flexibly connected sections, the forward section having an upwardly extending unobstructed delivery passage which terminates in the delivery mouth above the level of the fire. Mounted in the lower or horizontal portion of the conduit 13, is a conveyor screw 16, which is formed of a plurality of screw sections connected end to end by universal joints. The forward screw section 17 terminates at the lower end of the rising portion of the conduit. The screw flight of the section 17 of the conveyor screw is supported near its forward end directly on the bottom of the conduit, and rear end of the section 17 is formed with a squared or angular opening 18, which is adapted to receive and be supported by the squared projecting end 19 of a short manganese steel shaft 20, which is supported and rotates in a bearing 21. Bearing 21 comprises a supporting plate 22 extending across and mounted on the top of the conveyor conduit and a depending portion 24, which is formed with an opening 25 adapted to receive a manganese steel bearing bushing 27, which is held in said opening against rotation by engagement of a lug 28 on the bushing 27 with the walls of the opening 25 at one end of the bushing 27. The short shaft 20 formed at the end opposite to the end 19 with a similarly squared or angular projecting end 30. The end 30 is adapted to be received in a squared opening 31, the rotating member 32 of the conveyor screw which, as illustrated, forms one member of the universal joint 34, which connects the forward section of the screw to the next section of the screw to the rear. Carried by the end 19 of the short shaft 20, and located between the rear end of the screw section 17 and the bushing 20, is a manganese steel washer 36, which rotates with the screw and shaft and between this washer 36 and the bushing 27 and mounted upon the cylindrical portion of the shaft 20, is a second manganese steel washer 38. As the screw rotates to move the coal forward and thus receives a backward thrust, this thrust will be received by the bearing 21. The manganese steel washer 36, which rotates with the screw will bear directly on the washer 38 and this washer in turn will bear directly on the end of the stationary manganese steel bushing 27. The squared end 30 also carries a manganese steel washer 40 located between the end of the bushing 27 and the member 32. It will thus be seen that all surfaces of the bearing which are in rubbing contact with one another are composed of manganese steel. All of the manganese steel parts are of simple construction, may be readily made by casting and may be trued by grinding without machining.

While I have disclosed my invention as applied to a locomotive stoker conveyor screw bearing, it is obvious that the invention, in its broader aspects, is of much wider application and may be applied to bearings in general. For example, my invention may be applied to the supporting bearings for the buckets of steam shovels or dredges where, because the use to which such buckets are put, any attempt to materially reduce the wear of the bearing by means of lubrication would be futile.

This application is a continuation in part of my application filed February 1, 1924, and issued January 12, 1926, as Patent No. 1,569,655.

Having now described my invention, what I claim and desire to secure by Letters Patent is:

1. A bearing comprising cooperating members, each having a bearing surface movable over and bearing upon each other, and each of said cooperating members being composed of manganese steel, whereby said surfaces are formed of similar material.

2. A bearing adapted for use where lubrication is difficult, comprising a supporting member having an opening, a cylindrical manganese steel bushing fixed in said opening, a manganese steel shaft having a cylindrical portion rotatably mounted in, and in rubbing contact with, said bushing, and having squared projecting ends and shaft sections at opposite sides of said bushing, said shaft sections being formed with squared openings which receive said squared ends.

3. A supporting and thrust bearing adapted for use where lubrication is difficult, comprising a supporting member having an opening, cylindrical manganese steel bushing fixed in said opening, a manganese steel shaft having a cylindrical portion rotatably mounted in, and in rubbing contact with said bushing, and having a squared projecting end, a shaft having a squared opening receiving said squared portion, a manganese steel washer mounted on said squared portion and rotatable therewith and adapted to bear against the end of said second named shaft and a manganese steel washer mounted on the cylindrical portion of said first named shaft between said first named washer and said bushing, and adapted to bear against the end of said bushing.

4. A thrust bearing adapted for use where lubrication is difficult, comprising a supporting member having an opening, a cylindrical, manganese steel bushing fixed in said opening, shafting having a cylindrical portion formed with a manganese steel surface rotatably mounted in, and in rubbing contact with said bushing, and having an enlarged portion outside of said bushing, a manganese steel washer rotatable with said shafting and bearing against the end of said enlarged portion, and a manganese steel washer mounted on said cylindrical portion, between said first named washer and bushing and adapted to bear against the end of said bushing.

5. In a conveyor mechanism for fuel and the like where lubrication is difficult, the combination with a conduit, of conveying means therein comprising screw sections, a manganese steel stub shaft joining said sections and having a bearing surface intermediate its ends, a manganese steel sleeve bushing surrounding the bearing surface of said shaft to form a bearing support therefor, and end thrust bearing means in contact with said bushing.

6. In a conveyor mechanism for fuel and the like where lubrication is difficult, the combination with a conduit, of conveying means therein comprising screw sections, a manganese steel stub shaft joining said sections and having a bearing surface intermediate its ends, a manganese steel sleeve bushing surrounding the bearing surface of said shaft to form a bearing support therefor, and end thrust bearing means in contact with said bushing comprising thrust washers of manganese steel at the ends of said bushing.

ANDREW MURRAY HUNT.